US008978066B2

(12) United States Patent
Hao et al.

(10) Patent No.: US 8,978,066 B2
(45) Date of Patent: Mar. 10, 2015

(54) METHOD, COMPUTER PROGRAM PRODUCT, AND APPARATUS FOR PROVIDING COMMUNICATIONS WITH AT LEAST ONE MEDIA PROVIDER

(75) Inventors: Jianxiu Hao, Lexington, MA (US); Guillermo Ortiz, Belmont, MA (US); Diego S. Rozensztejn, Brookline, MA (US); Fenglin Yin, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1367 days.

(21) Appl. No.: 11/608,571

(22) Filed: Dec. 8, 2006

(65) Prior Publication Data
US 2008/0139193 A1 Jun. 12, 2008

(51) Int. Cl.
| | |
|---|---|
| *H04N 7/16* | (2011.01) |
| *H04N 7/10* | (2006.01) |
| *H04N 7/025* | (2006.01) |
| *H04N 5/445* | (2011.01) |
| *G06F 3/00* | (2006.01) |
| *G06F 13/00* | (2006.01) |
| *H04L 29/06* | (2006.01) |
| *H04N 7/173* | (2011.01) |
| *H04N 21/4227* | (2011.01) |
| *H04N 21/433* | (2011.01) |
| *H04N 21/475* | (2011.01) |
| *H04N 21/482* | (2011.01) |
| *H04N 21/63* | (2011.01) |

(52) U.S. Cl.
CPC ........ *H04L 65/4069* (2013.01); *H04N 7/17318* (2013.01); *H04N 21/4227* (2013.01); *H04N 21/4334* (2013.01); *H04N 21/4751* (2013.01); *H04N 21/482* (2013.01); *H04N 21/632* (2013.01)
USPC .................. 725/44; 725/25; 725/32; 725/58; 725/62

(58) Field of Classification Search
CPC ........................ H04N 21/4227; H04N 21/482
USPC .................. 725/39, 62, 46–47, 25, 32, 44, 58
See application file for complete search history.

(56) References Cited

U.S. PATENT DOCUMENTS

| | | | | | |
|---|---|---|---|---|---|
| 5,760,821 | A | * | 6/1998 | Ellis et al. ........................ | 725/54 |
| 5,988,078 | A | * | 11/1999 | Levine ............................ | 725/35 |
| 6,301,619 | B1 | * | 10/2001 | Segman .......................... | 725/46 |
| 6,489,986 | B1 | * | 12/2002 | Allen .......................... | 348/14.01 |

(Continued)

FOREIGN PATENT DOCUMENTS

WO   WO 9959328 A2 * 11/1999

*Primary Examiner* — Randy Flynn

(57) ABSTRACT

Methods, computer program products, and apparatuses are provided for allowing a user to communicate with a set top box and a media content server through a mobile communication device, such as a cellular phone. The user may be able to request and receive a customer specific interactive programming guide through the mobile communication device. The interactive programming guide may allow the user to search and record media programs, including sending recording commands to a set top box to record a particular media program. The interactive programming guide may also allow the user to order and receive media programs to the mobile communication device. Embodiments may provide a personal video recorder proxy server as an interface between the mobile communication device and the set top box and the media content server.

19 Claims, 12 Drawing Sheets

(56) References Cited

U.S. PATENT DOCUMENTS

| | | | |
|---|---|---|---|
| 7,344,084 B2* | 3/2008 | DaCosta | 235/472.01 |
| 7,587,731 B1* | 9/2009 | Oyabu et al. | 725/46 |
| 7,596,797 B1* | 9/2009 | Kapner et al. | 725/44 |
| 7,812,854 B1* | 10/2010 | Delker et al. | 348/14.01 |
| 2002/0029384 A1* | 3/2002 | Griggs | 725/46 |
| 2002/0054206 A1* | 5/2002 | Allen | 725/133 |
| 2002/0059596 A1* | 5/2002 | Sano et al. | 725/39 |
| 2002/0104090 A1* | 8/2002 | Stettner | 725/60 |
| 2002/0199188 A1* | 12/2002 | Sie et al. | 725/35 |
| 2003/0009757 A1* | 1/2003 | Kikinis | 725/39 |
| 2003/0030751 A1* | 2/2003 | Lupulescu et al. | 725/39 |
| 2003/0050062 A1* | 3/2003 | Chen et al. | 455/3.04 |
| 2003/0066092 A1* | 4/2003 | Wagner et al. | 725/39 |
| 2003/0226143 A1* | 12/2003 | Michael et al. | 725/32 |
| 2003/0227485 A1* | 12/2003 | Krakirian et al. | 345/771 |
| 2004/0015989 A1* | 1/2004 | Kaizu et al. | 725/39 |
| 2004/0210628 A1* | 10/2004 | Inkinen et al. | 709/201 |
| 2005/0028208 A1* | 2/2005 | Ellis et al. | 725/58 |
| 2005/0055716 A1* | 3/2005 | Louie et al. | 725/58 |
| 2005/0138657 A1* | 6/2005 | Leftwich | 725/45 |
| 2005/0289589 A1* | 12/2005 | Vermola | 725/35 |
| 2006/0041910 A1* | 2/2006 | Hatanaka et al. | 725/58 |
| 2006/0129694 A1* | 6/2006 | Ishida et al. | 709/238 |
| 2006/0190963 A1* | 8/2006 | Wagner et al. | 725/39 |
| 2007/0067808 A1* | 3/2007 | DaCosta | 725/39 |
| 2007/0094689 A1* | 4/2007 | McElhatten et al. | 725/39 |
| 2007/0180068 A1* | 8/2007 | Haeuser et al. | 709/220 |
| 2007/0240182 A1* | 10/2007 | Callahan | 725/37 |
| 2008/0022322 A1* | 1/2008 | Grannan et al. | 725/78 |
| 2008/0046935 A1* | 2/2008 | Krakirian | 725/87 |
| 2008/0092175 A1* | 4/2008 | Peacock et al. | 725/60 |
| 2008/0127257 A1* | 5/2008 | Kvache | 725/39 |

* cited by examiner

METHOD, COMPUTER PROGRAM PRODUCT, AND APPARATUS FOR PROVIDING COMMUNICATIONS WITH AT LEAST ONE MEDIA PROVIDER

BACKGROUND OF THE INVENTION

An interactive programming guide (IPG) provides an on-screen guide for a user to browse current and future TV listings. The user may be able to select particular programs for viewing or recording, or to inquiry about more information relating to a particular program through the on-screen guide on the television. The user may use a remote control device or buttons on the television or a set top box to browse through the guide displayed on the television and to enter viewing or recording selections.

A set top box is often connected directly to the television and in some cases may be integrated into the television. In general, the set top box is configured to receive and process the media signals from a media provider to the television, including providing the information for the IPG. Also, the set top box may include recording features for recording and storing particular programs based on requests from the user.

Some IPGs and set top boxes are configured to allow the user to set up recordings for future programs either for a particular time and channel or for a particular program or series. However in order to change or confirm a recording setting or to access other options of the IPG, the user typically has to be near the television in order to see the display on the television and to send the commands or other entries to the set top box.

BRIEF DESCRIPTION OF THE SEVERAL VIEWS OF THE DRAWING(S)

DETAILED DESCRIPTION OF PREFERRED EMBODIMENTS

Exemplary embodiments are described hereinafter with reference to the accompanying drawings, in which exemplary embodiments and examples are shown. Like numbers refer to like elements throughout.

Figure 1:
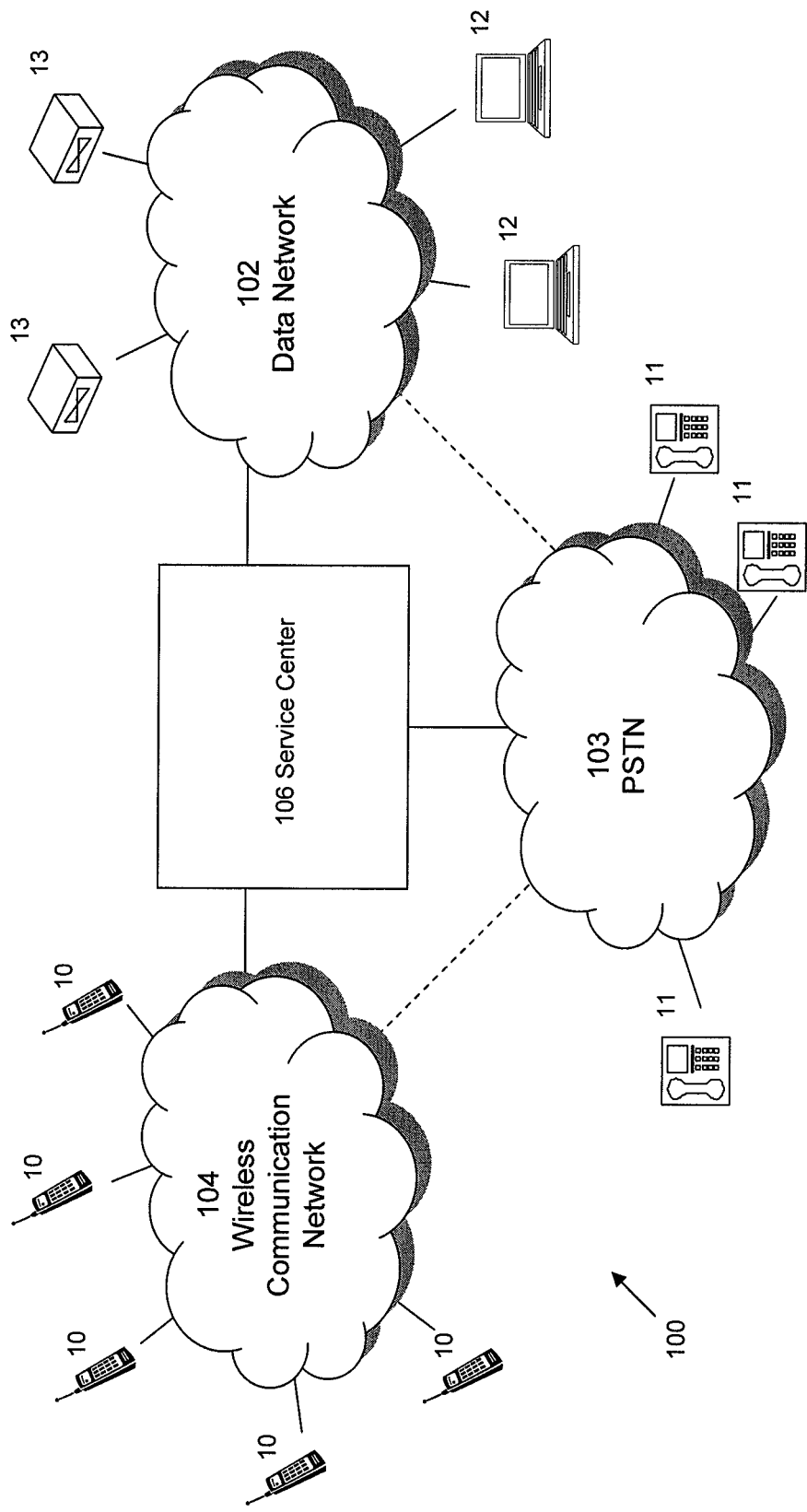
FIG. 1 is a block diagram of a telecommunication environment consistent with exemplary embodiments.

In FIG. 1, mobile communication devices 10 are configured to operate within a telecommunication environment 100. The mobile communications devices 10 may be selectively and communicatively coupled to one another and to other communication and peripheral devices 11, 12, 13 within the telecommunication environment 100 for receiving and transmitting information. The information may be in a variety of forms including voice signals, text messages, data files, and programming instructions. The mobile communication devices 10 and the other communication and peripheral devices 11, 12, 13 may be communicatively coupled to each other through one or more communication networks 102, 103, 104.

For example, the mobile communication devices may include cellular phones, personal digital assistants ("PDA"), and any other wireless personal communication system ("PCS") operable within a wireless communication network 104. The wireless communication network may be based on a variety of technologies and platforms including SS-7 based networks, cellular or third-generation cellular networks. The wireless communication network may be data-enabled allowing for the digitalization of voice signals and the transmission of other digital data. For example, the wireless communication network may incorporate evolution-data optimized (EVDO) services.

Figure 2:
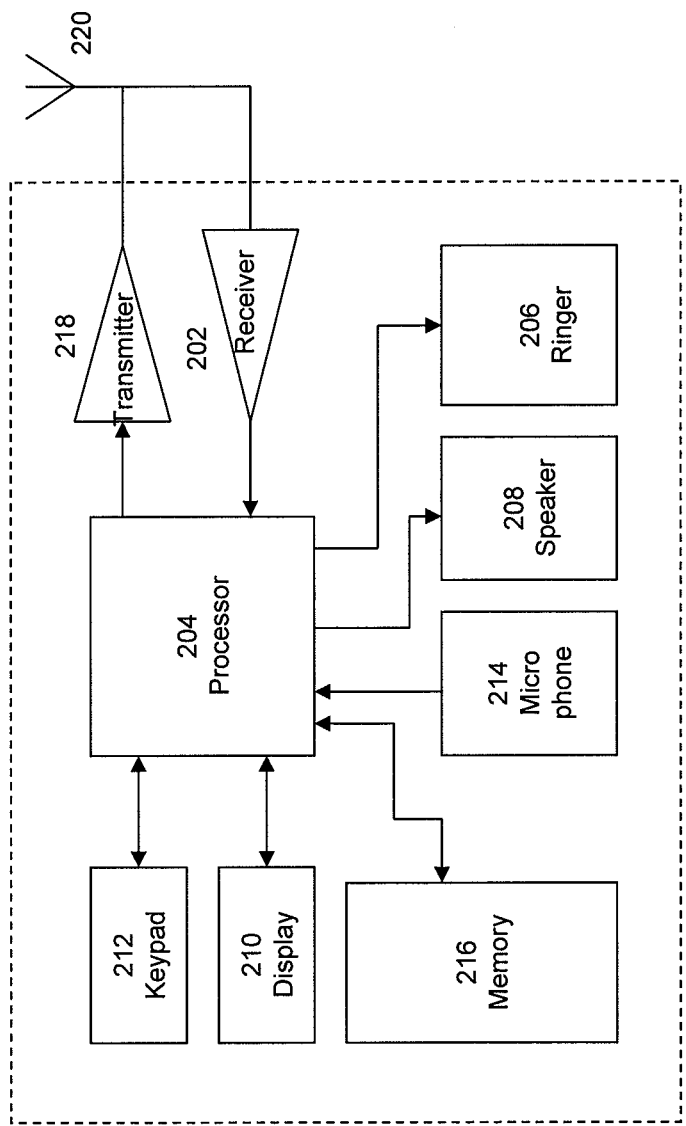
FIG. 2 is a block diagram of a mobile communication device consistent with exemplary embodiments.

FIG. 2 illustrates an example of a mobile communication device 10. The mobile device 10 may include a receiver 202, processor 204, a ringer 206, a speaker 208, a display 210, a keypad 212, a microphone 214, at least one memory element 216, a transmitter 218, and an antenna 220. The receiver 202 may be configured to receive incoming signals to the mobile communication device 10. The incoming signals may originate from other communication or peripheral devices or other elements of the telecommunication environment 100 and be routed through the wireless communication network 104 to the mobile communication device 10. The processor 204 processes the received signal and determines a response. For example, if the incoming signal is a telephone call from another communication device, the processor 204 may command the ringer 206 to activate to alert the user of the mobile communication device 10 of the incoming telephone call. The processor 204 may also command the display to show the telephone number of the incoming call and may review the memory element 216 to determine whether the identity of the caller is known and display that as well. The speaker 208 allows the user to hear the caller and the microphone 214 allows the user to talk back to the caller. The transmitter 218 transmits the user's return signal or call back to the caller. The keypad 212 allows the user to enter phone numbers, move through menus that are shown on the display and provided by an application platform of the mobile communication device 1013, and select and enter commands into the mobile communication device 10. In some embodiments, the processor 204 may be able to accept some voice commands through the microphone. The memory element 216 may maintain various information such as a call history, a contact list, user preferences, and programming instructions pertaining to the operability of the mobile communication device 10.

As shown in FIG. 1, other communication and/or peripheral devices may include one or more computing devices 12, such as desktops and laptops, that are within or directly connected to a data network 102, such as a Wide Area Network ("WAN"), Local Area Network ("LAN"), an intranet and/or the Internet, and have various communication programming applications including email, Internet browser, instant or text messaging, or voice over IP (VOIP) applications. In yet another example, one or more of the communication devices may include one or more telephone devices 11 connected to the Public Switched Telephone Network ("PSTN") 103 or a private branch exchange ("PBX"). Moreover, a communication device may be part of a hybrid apparatus (not illustrated) that is configured to work within more than one type of communication networks. For example, the communication device may be a telephone device configured to work both within a wireless network and landline or wired network.

Figure 3:
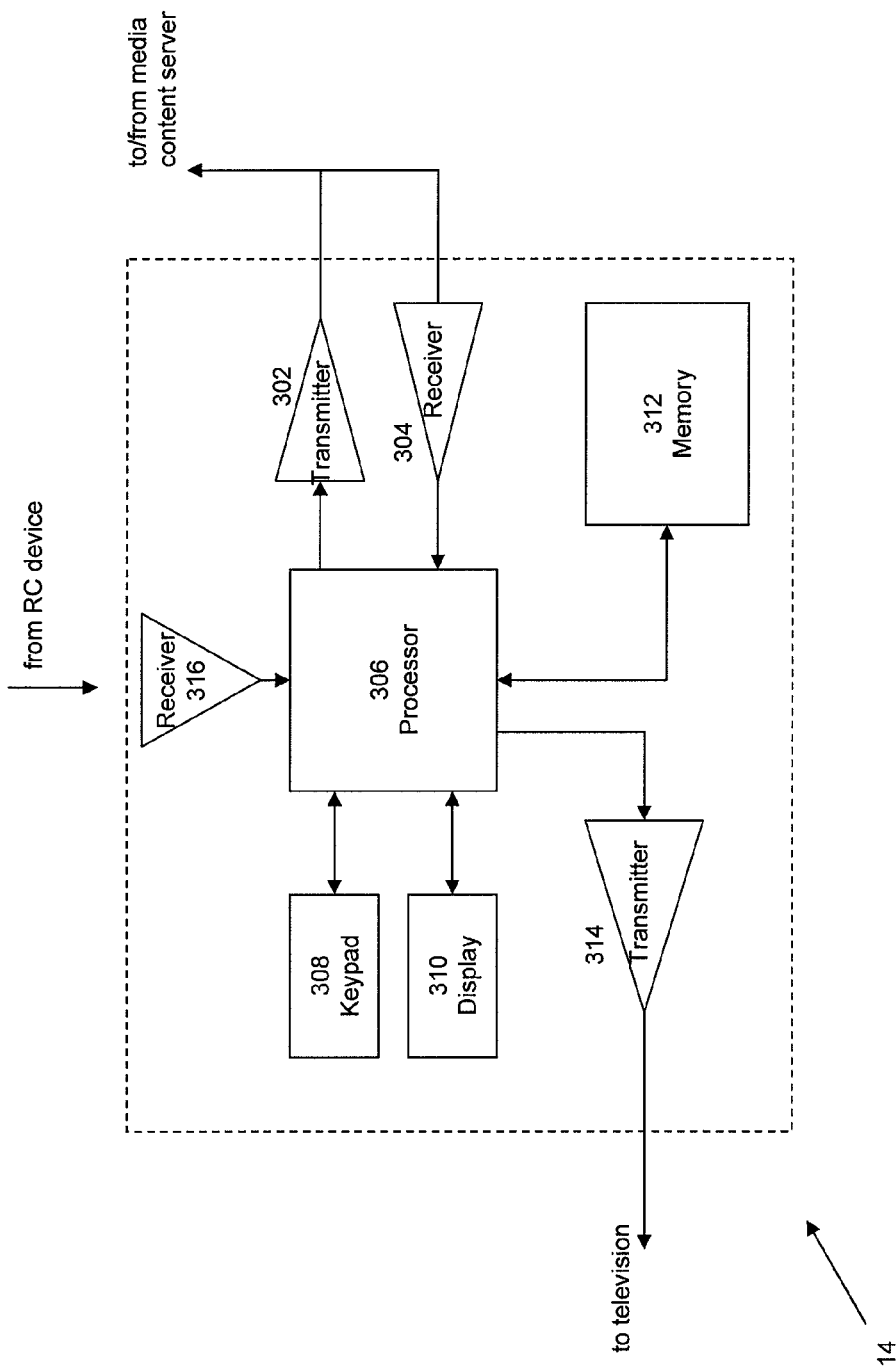
FIG. 3 is a block diagram of a set top box consistent with exemplary embodiments.

As shown in FIG. 3, another communication device may be a set top box 14. The set top box 14 may be configured to receive one or more signals representing a media program from an external source and convert the signals into the media program for display on a television. The set top box 14 may include a first transmitter 302, a first receiver 304, a processor 306, a keypad 308, a display 310, at least a first memory element 312, a second transmitter 314, and a second receiver 316. The first receiver 304 is configured to receive the media program from the external source through a data network 102. For example, the set top box may include an adapter or port for receiving a fiber optic cable or a coaxial cable of a data network. And the external source may be one or more media content servers or other computing devices of a media provider that is in communicatively coupled to the set top box through the data network. The processor 306 may be configured to provide processing and command functions, which may include translation or conversion of the received signals into an output suitable for display on the television. The processor 306 may also be configured to send the media program through the second transmitter 314 of the set top box 14 to the television. Although not illustrated, the media set top box may have a third transmitter and the processor 306 may be configured to process the received signals into two outputs, i.e. a video output sent through the second transmitter for display on the television and a sound output sent through the third transmitter to a sound system either integrated with the television or a stand alone system. The display of the set top box may include information such a clock and/or the current channel for the television, and/or indicators on whether or not the set top box is on and/or whether it is recording. The keypad 308 may include one or more buttons to allow a user to enter commands and selections into the set top box 14. The second receiver 316 may be configured to receive radio signals from a remote control device (not illustrated) as another method of receiving commands and selections from a user. The processor 306 may also be configured to send a request through the first transmitter 302 to the media provider for particular media program based on commands and selections from the user. The request may include a live media program or for a video on demand ("VOD"). The processor 306 may also record the signals for the requested media program into the memory element 312 based on commands and selections from the user. For example, the user may request for a future program to be recorded. At the scheduled time for the media program, the processor 306 may request the corresponding signals for the media program, also referred to herein as media programming signals, and store the media programming signals into the memory element. The stored or recorded media program is viewable to the user upon request. In particular, the processor 306 may retrieve a recorded program from the memory element 312 and send it to the television to be viewed by the user upon request from the user. The memory element 312 may also maintain programming instructions, i.e. software, pertaining to the functions and operability of the set top box.

The set top box 14 may also be configured to receive signals from the media provider that represent an interactive programming guide ("IPG") for the user. In particular, upon request from the user, the processor 306 sends a request to the media provider for the signals that provide the IPG. In response to the request, the media provider sends the IPG to the set top box. The IPG may be customer specific, i.e. the media provider may send an IPG that corresponds to an account of the user, which may take into consideration the channels available to the user based on the location of the set top box and the subscription of the user, e.g. a basic channel package or a channel package with premium channels.

The processor 306 sends the IPG to the television for interaction with the user. The IPG may display a listing of channels, times, and programming and the user may browse through the listing through either the keypad 308 or remote control device. The user may be able to select programs to watch or to be recorded, call up recorded programs, and/or order videos on demand. The processor 306 either executes the selections or stores them within the memory element 312 for future execution.

It is understood that the set top box may be a stand alone device or be integrated within the television. Moreover, a television may be any monitor capable of displaying the media content from the set top box. For example, a television may be a LCD display or monitor.

Referring back to FIG. 1, the telecommunication environment 100 may also include at least one service center 106. The service center 106 may provide a platform for managing information or communications between the differing networks 102, 103, 104 and between communications devices 10, 11, 12 within the same network or differing networks. The service center 106 may also provide gateway functions, such as code and protocol conversions, to transfer information or communications between the networks 102, 103, 104. The service center 106 may be implemented using a combination of hardware, software, and/or firmware. For example, the service center 106 may be implemented using a plurality of general purpose computers or servers. Although the service center 106 is shown with direct connections to the networks 102, 103, 104 any number and type of network elements may be interposed between the service center 106 and any one or all of the networks. Moreover, it is understood that the service center 106 may be connected to different, additional, or less communication networks than what is illustrated in FIG. 1.

Figure 4:
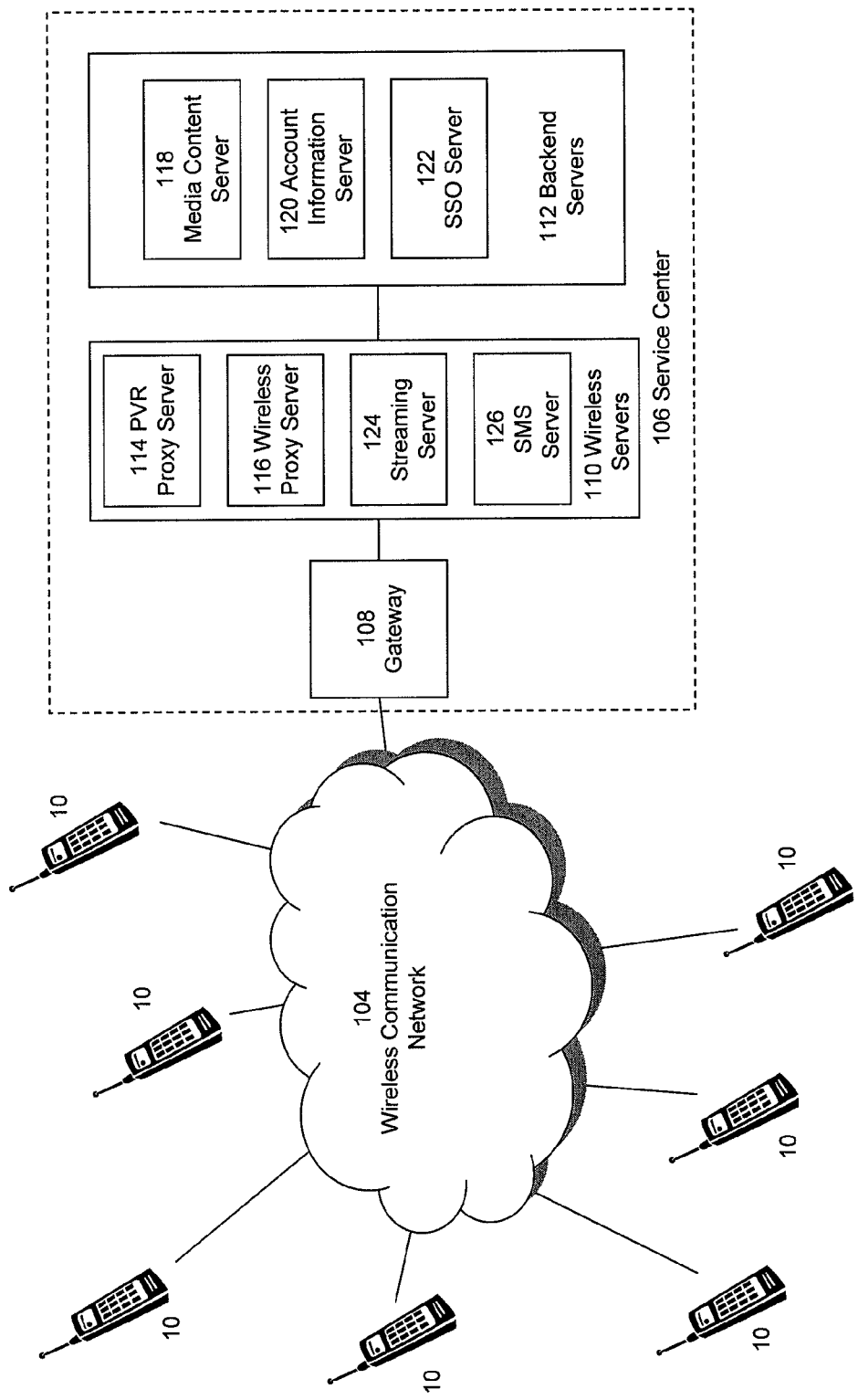
FIG. 4 is a block diagram of a telecommunication environment consistent with exemplary embodiments.

FIG. 4 illustrates an exemplary embodiment of a service center 106 and a plurality of mobile communication devices 10 of a wireless communication network 104. The service center 106 may include a gateway 108, one or more wireless servers 110, and one or more backend servers 112.

The gateway 108 may provide protocol translating functions and may be configured to receive and send instructions and signals for a variety of protocols and platforms. For example, the gateway 108 may be configured to interface between the other devices and elements of the service center and the mobile communication devices operating with various application platforms or protocols including binary runtime environment for wireless ("Brew") protocol, wireless application protocol ("WAP"), and java platform, micro edition ("JavaME" oe "J2ME") protocol. Although FIG. 4 illustrates one gateway 108, the service center 106 may include more than one gateway for different types of communication devices.

The wireless servers 110 may include a wireless proxy server 116 and a personal video recorder ("PVR") proxy server 114. The wireless proxy server 116 may be configured to provide cached information from one or more backend servers 112 and/or the wireless proxy server 116 may modify communications and requests between the backend servers 112 and the mobile communication devices 10. The PVR proxy server 114 may be configured to send, store, and receive information from, to, and between a mobile communication device, the media provider, and a set top box. Other wireless servers 100 may further include a streaming server 124 for sending informing in a streaming format to one or more mobile communication devices 10 and/or a SMS server 126 for providing short message service to one or more mobile communication devices 10.

The backend servers 112 may include an account information server 120, a single sign-on server or SSO server 122, and one or more media content servers 118 (collectively, the media content servers may be referred to as a content server farm). The account information server 120 may store accounts for one or more of the users of the communication or peripheral devices 10, 11, 12, and 13. The account information server 120 may include or otherwise be in communication with at least one memory element for storing the information and a processing element for processing the information, including in response to a request or instructions received from users. In general, an account includes information and/or instructions pertaining to a particular user. The SSO server may be configured to authenticate and approve access to information stored within the account information server 120 or other information stored in additional servers of the service center 106. In particular, the user may access his account on the account information server 120 by logging on through the SSO server 122 by using one of the communication devices 10, 11, 12. For example, the user may be able to log on through a web page on a computing device 12. The media content servers 118 collectively provide at least some of the storage and processing functions for the media provider for delivering the media programs and/or IPGs to the set top boxes and to at least one or more of the mobile communication devices. For example, the media content servers 118 may be configured to receive a request from at least a first set top box 13 for an IPG and to transmit the IPG to the set top box 13. The IPG may be a customer specific IPG for the first set top box 13. In addition, to communicating with the set top box 13, the media content servers 118 may be configured to receive a request from the PVR proxy server 114. For example, the PVR proxy server 114 may request the customer specific IPG for the first set top box 13 and the media content servers 118 may respond to the request by transmitting the IPG to the PVR proxy server 114.

Figure 5:
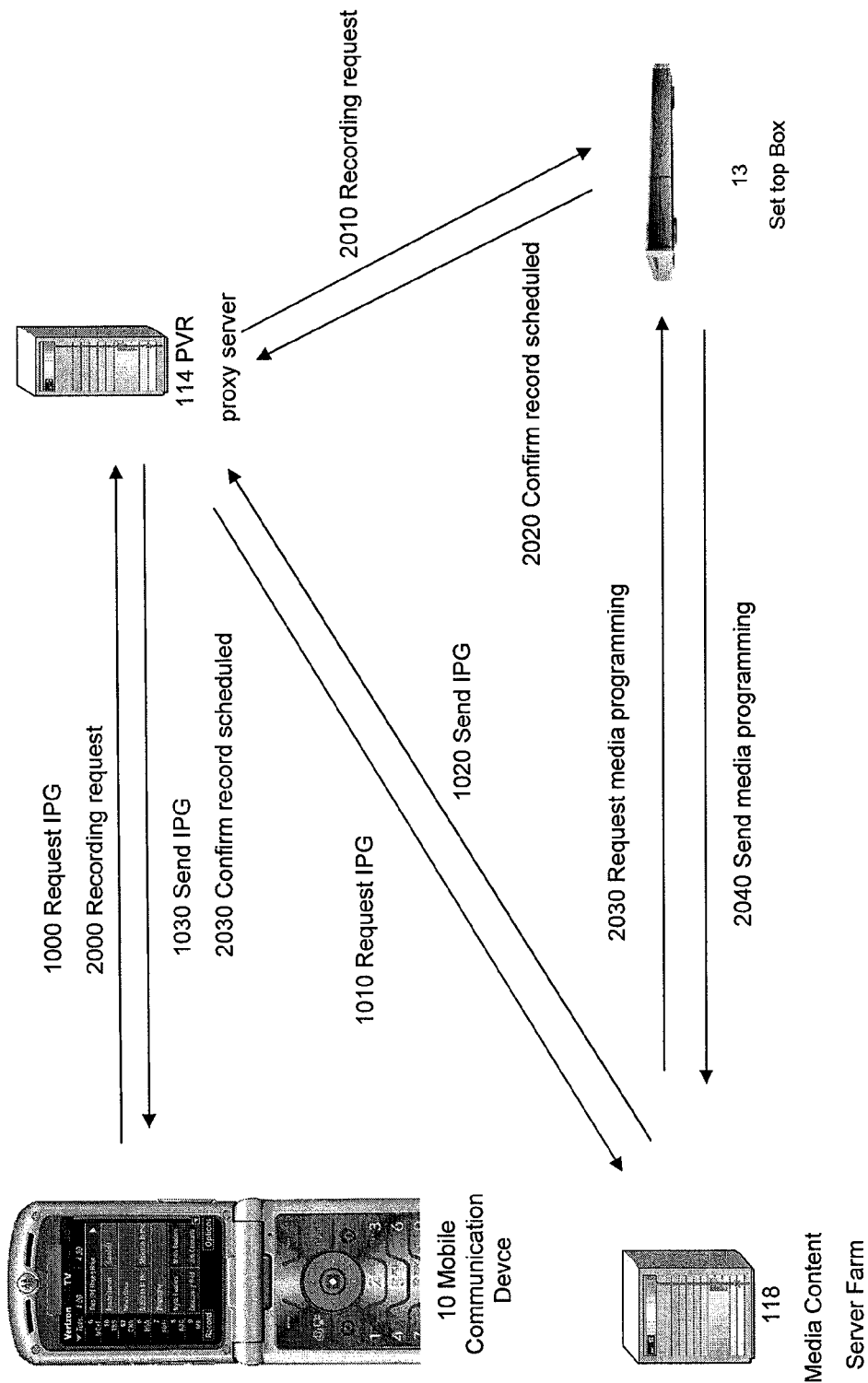
FIG. 5 is a flow chart illustration of a method according to an exemplary embodiment.

FIG. 5 illustrates a process consistent with embodiments. A user may request a customer specific IPG through his or her mobile communication device, such as a cellular phone. The mobile communication device sends the request for the IPG to the PVR proxy server 1000. The PVR proxy server requests the customer specific IPG from the media content servers 1010. The request may include an identification of the corresponding set top box in order to allow the media content servers to determine the proper customer specific IPG. The media content servers send the customer specific IPG to the PVR proxy server 1020. And the PVR proxy server sends the customer specific IPG to the mobile communication device 1030.

As stated above, the mobile communication device is configured to receive incoming communications signals, including the signals that provide the IPG from the PVR proxy server. The IPG is viewable on the display of the mobile communication device. The IPG may provide a listing of programs, channels, and time periods. For example, the IPG may provide the ability to select programs by date and time up to a certain period of time (e.g. 14 days) in advance of the current day, provide channel numbers and names, browse in 30 minute time periods, and provide a color code to represent different kind of programs or genres. Depending on the size of display, a range of channels and times may appear on the display and the user may change the displayed channels and times by browsing or searching through the IPG. The user may change and search the IPG through the keypads of the mobile communication device and/or through voice commands. The IPG may provide a search engine allowing the user to search programs by channel, title, time, and/or program types and genres. The IPG may also show previously recorded programs on the set top box, scheduled recordings, and video on demand purchases and options. As another feature, the IPG may also allow the user to elect to download or receive programming or video on demand to the mobile communication device.

As yet another feature, the IPG may allow the user to set or change parental controls on the set top box. Parental controls may allow a user to set up control by program ratings or by channels, i.e. limit access to a particular program based on a program rating or channel. In particular, the setting may be by individual ratings, e.g., "R" is not allowed, and/or by a rating range, e.g., any program rating above "PG-13" is not allowed. The setting may be by channels, i.e., the control may block the programs from one or more channels, e.g., HBO may be blocked. The setting may also be combined with time, e.g., no TV from 3-5 μm while the children are working on their homework. Any change, edit, or command pertaining to the settings of the parental controls is generally referred to herein as a "parental control selection."

Furthermore, the parental controls may be combined with IP data (messages and/or images) requested by a user to be overlaid into the media programming or replace the media programming sent to the set top box 14. For example, a user may send a request from his or her mobile communication device 10 through the PVR proxy server 114 to the media content servers 118 to either overlay IP data into the media programming sent to a set top box 13 or replace the media programming with IP data. The IP data can be served through the media content servers 118 to the set top box 13. As an example, a user parent away on a business trip can select to block all media programming and to provide a personal message, such that when a user child of the user parent turns on the TV, a text box displays "Honey, please do your homework." In other words, in this example, whenever the child turns on the TV, she will see only the message from her parent. The user parent may configure the message to change such that around dinner time, the message becomes "Honey, please eat your vegetables." And/or the user parent may configure the message and blocked channel selections to change at or after a particular time, such that the Disney channel is unblocked. The user parent may also change the message on the day he or she is traveling back such that message provides real time flight information for the traveling parent's flight home.

The IPG may also provide DVR and VOD features such that a user may schedule or edit a previous scheduled recording or order a VOD to the set top box. For example, FIG. 5 illustrates a DVR feature consistent with embodiments. As previously stated, the user may select a program to be recorded through the IPG displayed on his or her mobile communication device. The mobile communication device sends the recording request to the PVR proxy server 2000. And the PVR proxy server sends the recording request to the set top box 2010. The set top box stores the request and processes the request as described below. The set top box may also send a confirmation of the scheduled recording to the PVR proxy server 2020. And the PVR proxy server may send the confirmation of the scheduled recording to the mobile communication device 2030. Before or at the scheduled time, the set top box processes the request by requesting the media programming signals for the scheduled program from the media content servers 2030. The media content servers sends the media programming signals for the program at the scheduled time to the set top box 2040. And the set top box records the program according to the request. Although not illustrated, in some embodiments, the set top box may send confirmations of the recording in progress and/or successful completion of the recording to the mobile communication device through the PVR proxy server. The set top box may also download the recorded media program to the mobile communication device in some embodiments.

As discussed above, the PVR proxy server may function as an interface between the mobile communication device and the media content servers and the set top box. The PVR proxy server may include or otherwise be in communication with a processor and at least one memory element. The processor may provide processing and command functions and translation and/or conversion functions between differing platforms and/or protocols of the media content servers, the set top box, and the mobile communication device. The memory element may maintain programming instructions, i.e. program, comprising one or more executable portions for performing the operations of the PVR proxy server.

Figure 6:
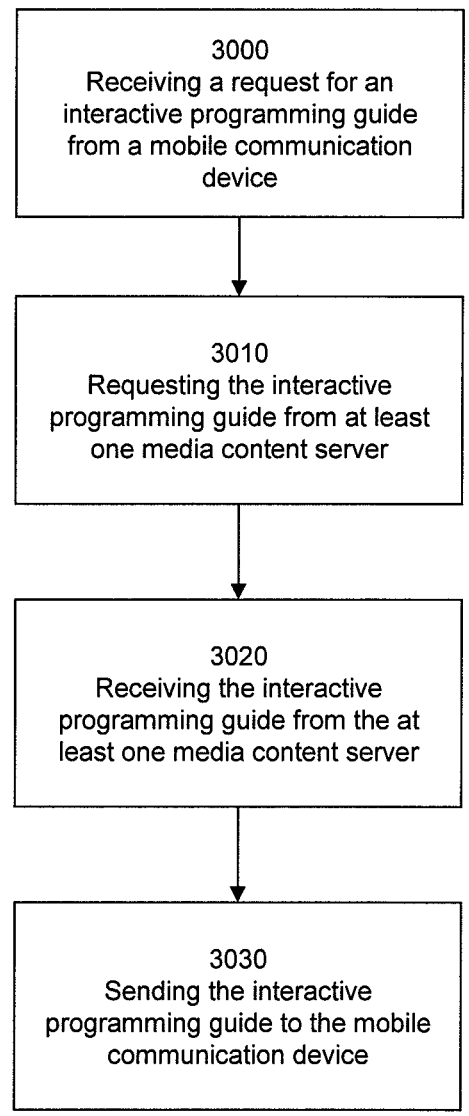
FIG. 6 is a flow chart illustration of a method according to another exemplary embodiment.

FIG. 6 illustrates a method according to an embodiment for downloading an IPG to a mobile communication device. The method may include receiving a request for a IPG from a mobile communication device 3000, requesting the IPG from at least one media content server 3010, and receiving the IPG from the at least one media content server 3020, and sending the IPG to the mobile communication device 3030.

Figure 7:
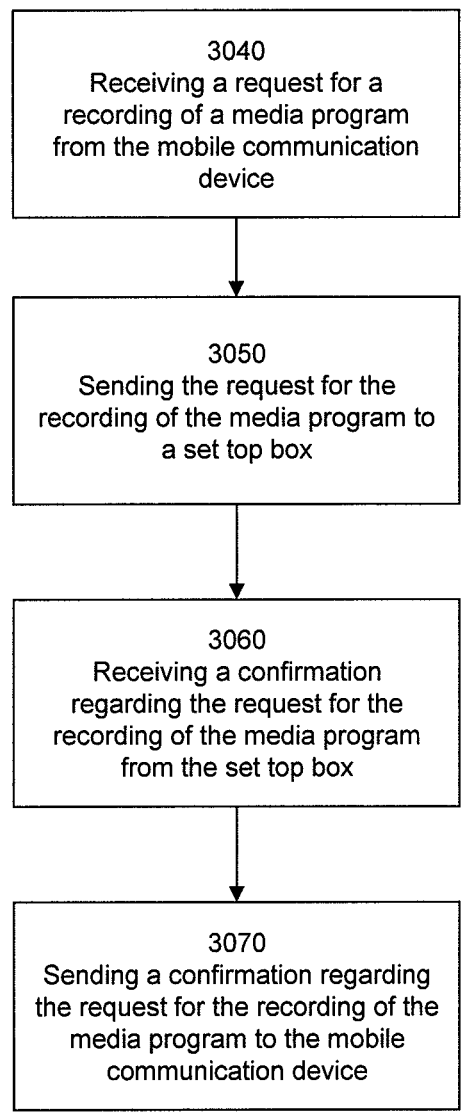
FIG. 7 is a flow chart illustration of a method according to another exemplary embodiment.

FIG. 7 illustrates a method according to another embodiment for requesting a media program based upon an input from a mobile communication device. The method may include receiving a request for a recording of a media program from a mobile communication device 3040, sending the request for the recording of the media program to a set top box 3050, receiving a confirmation regarding the request for the recording of the media program from the set top box 3060, and sending a confirmation regarding of the request for the recording of the media program to the mobile communication device 3070.

Figure 8:
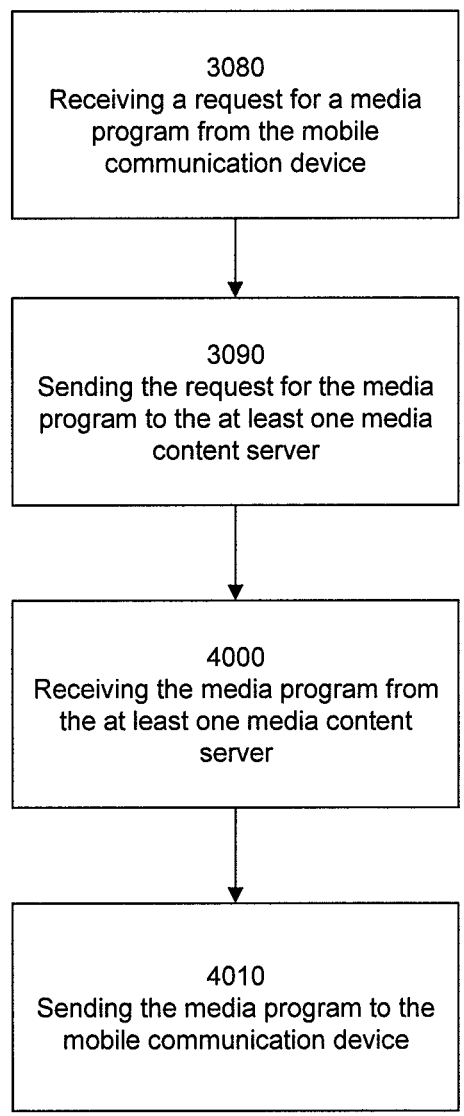
FIG. 8 is a flow chart illustration of a method according to yet another exemplary embodiment.

FIG. 8 illustrates a method according to yet another embodiment for actually recording a media program with a set top box based upon an input provided by a mobile communication device. The method may include receiving a request for a media program from a mobile communication device 3080, sending the request for the media program to the at least one media content server 3090, receiving the media program from the at least one media content server 4000, and sending the media program to the mobile communication device 4010.

Figure 12:
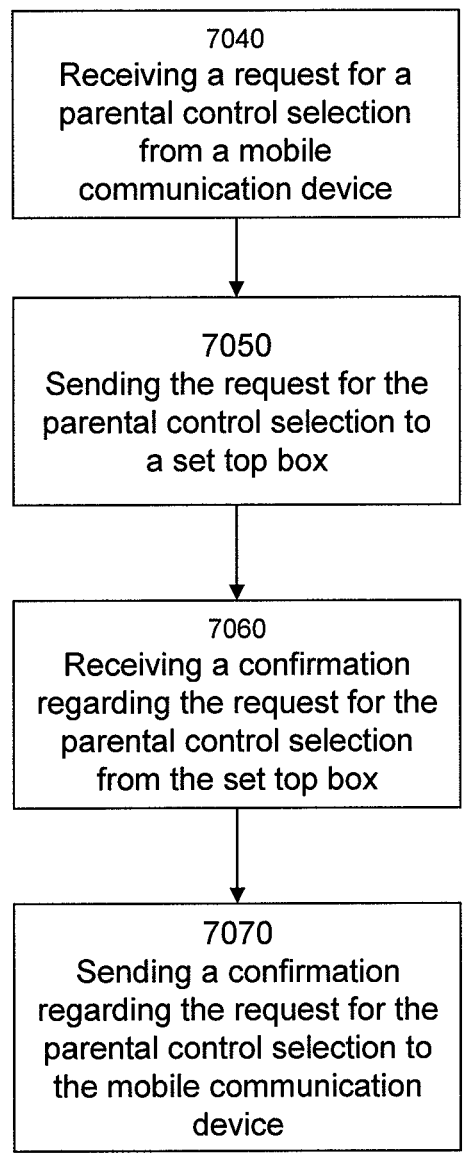
FIG. 12 is a flow chart illustration of a method according to an exemplary embodiment.

FIG. 12 illustrates a method according to another embodiment for selecting parental controls from a mobile communication device to the set top box. The method may include receiving a request for a parental control selection from a mobile communication device 7040 and sending the request for the parental control selection to a set top box 7050. The method may further include receiving a confirmation regarding the request for the parental control selection from the set top box 7060 and sending a confirmation regarding the request for the parental control selection to the mobile communication device 7070.

The operations illustrated in FIGS. 6, 7, 8, and 12 may be combined and be performed, for example, by a PVR proxy server or the like. For example, a method may include the operations of FIGS. 6 and 7 and be performed, for example, by a PVR proxy server or the like. For another example, a method may include the operations of FIGS. 6 and 8 and be performed, for example, by a PVR proxy server or the like. As yet another example, a PVR proxy service may perform the operations of FIG. 12.

It is understood that the operations described for the illustrated methods of FIGS. 6 through 8 and 12 may be performed through hardware, software, or combination thereof. Therefore embodiments may take the form of hardware systems and/or apparatuses, software, or combinations thereof. As an example, embodiments may include a computer program product stored on a computer-readable storage medium (i.e. software) comprising of one or more executable portions for performing the operations described herein. As another example, one or more of the devices and/or systems of the service center may perform one or more of the operations. In one embodiment, the processor of the PVR proxy server may be configured to perform one or more of the operations illustrated in FIGS. 6 through 8 and 12. In another embodiment, for example, the processor of the set top box may be configured to perform the operations depicted at least in FIG. 8.

The processor of the PVR proxy server, or of the set top box, or of the other devices disclosed herein may be embodied in many ways. For example, the processors may each be embodied as a coprocessor, a controller or various other processing means or devices including integrated circuits such as, for example, an application specific integrated circuit ("ASIC"). The memory elements described herein may be various memory structures including volatile and non-volatile memory structures. Any of the memory elements may be configured to store information, data, applications, instructions or the like for enabling the devices disclosed herein to carry out various functions in accordance with exemplary embodiments. For example, a memory element could be configured to buffer input data for processing by a respective processor.

Embodiments allow a user to access the customer specific IPG on his or her mobile communication device. In some embodiments, the user may be able to request and edit scheduled recordings for particular media programs away from his or her house through his or her mobile communication device. In other embodiments, the user may able to request and view media programs on his or her mobile communication device.

In other embodiments, rather than or addition to the set top box 13 receiving media programming signals from one or more media content servers 118, the set top box 13 may be configured to receive and send signals to other external sources. For example, in the embodiment illustrated in FIG. 9, the set top box 13 may be communicatively coupled to a real time camera device 20, such as a webcam.

Figure 10:
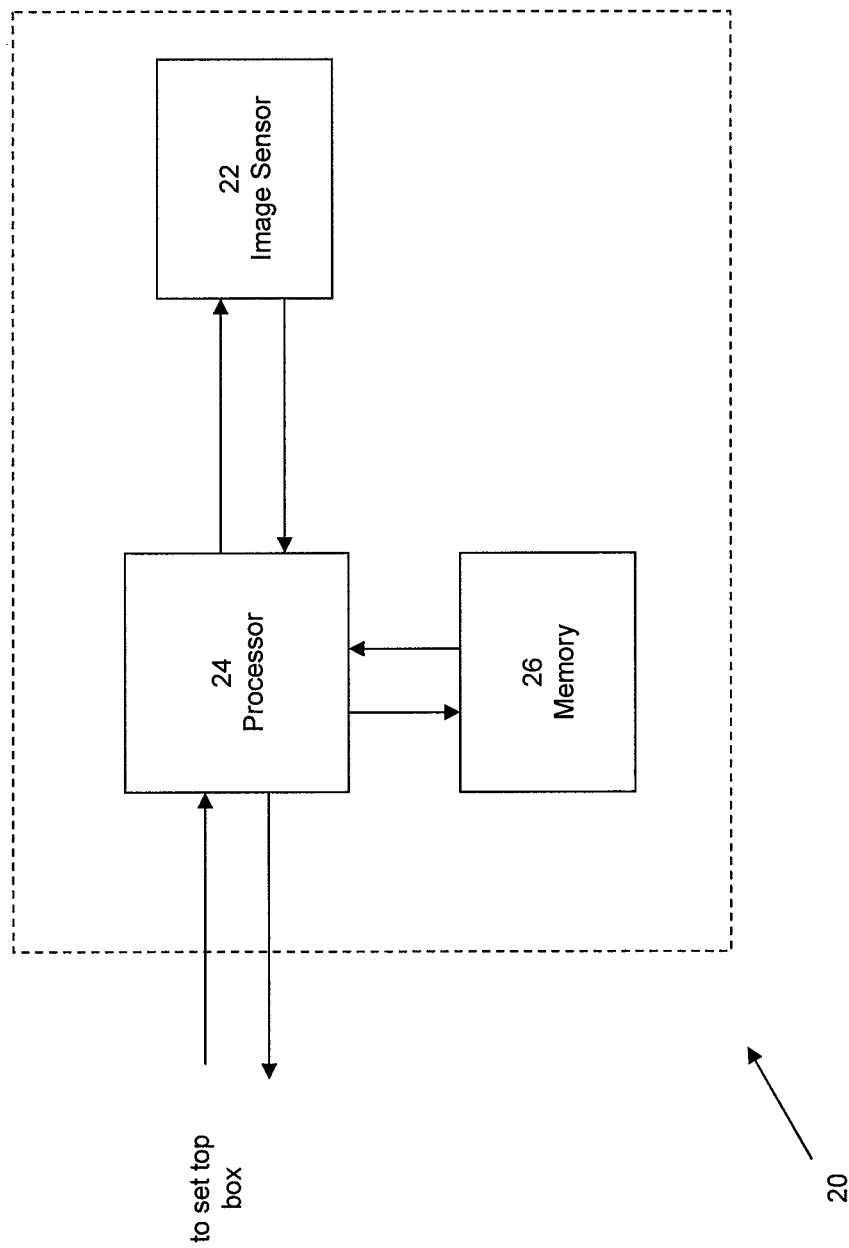
FIG. 10 is a block diagram of a camera device consistent with exemplary embodiments.

FIG. 10 illustrates an example of a real time camera device 20. The camera device 20 may include an image sensor 22 and a processor 24. The camera device may also include at least one memory element 26. The image sensor 22 is configured to capture images at a preset interval. The processor 24 is configured to receive the captured images and send the images as signals, referred to as imaging signals, to the set top box 13 and/or to the at least one memory element 26. The processor 24 is also configured to receive commands from the set top box 13. The processor may be embodied as a coprocessor, a controller or various other processing means or devices including integrated circuits such as, for example, an application specific integrated circuit ("ASIC"). The memory element may be a volatile and non-volatile memory structure and be configured to store information, data, applications, instructions or the like for enabling the camera device to carry out various functions in accordance with exemplary embodiments. For example, a memory element could be configured to buffer input data for processing by the processor.

Figure 9:
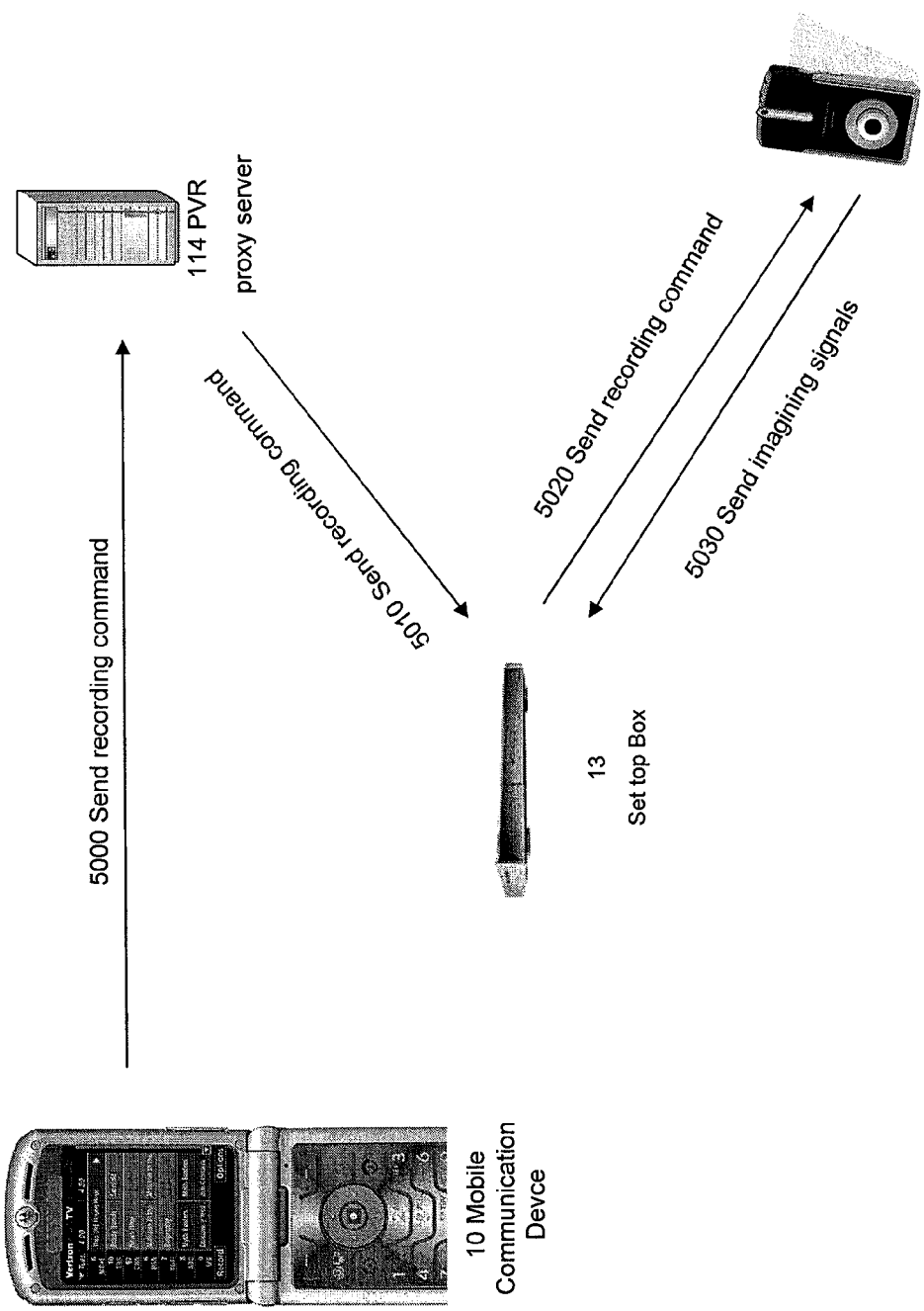
FIG. 9 is a flow chart illustration of a method according to an exemplary embodiment.

As shown in FIG. 9, the user may send a command from a mobile communication device to activate a recording operation of the camera device to the PVR proxy server 5000. The PVR proxy server may then send the command to the set top box 5010. And the set top box may send the command to the camera device 5020. The camera device may begin recording, i.e. capturing images, and sending the imaging signals to the set top box 5030. And the set top box may record and store the imaging signals, such that the user may view the recorded imaging signals on the television upon request through the set top box. In some embodiments, the imaging signals may be sent to the mobile communication device from the set top box to the PVR proxy server and then to the mobile communication device.

Figure 11:
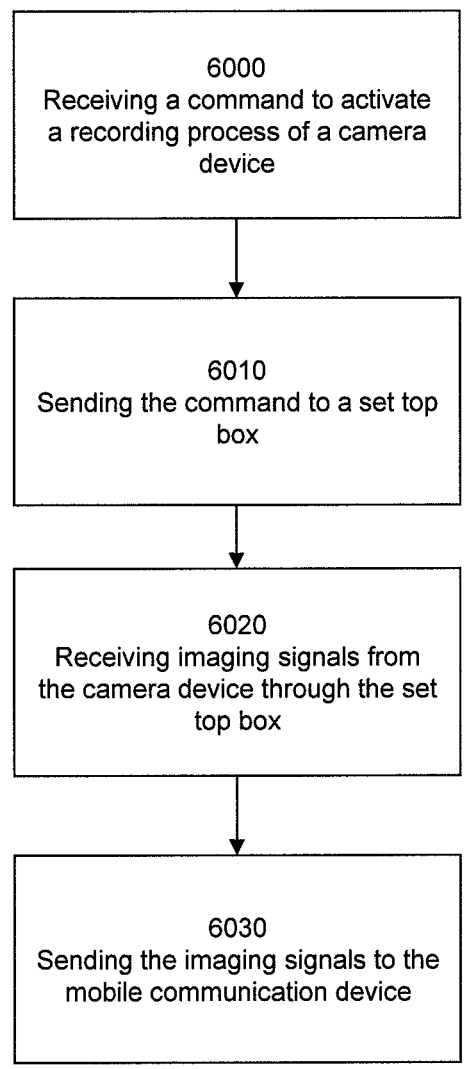
FIG. 11 is a flow chart illustration of a method according to an exemplary embodiment.

FIG. 11 illustrates a method according to an embodiment of FIG. 9 taken from the perspective of a PVR proxy server or the like. The method may include receiving a command to activate a recording process of a camera device 6000 and sending the command to a set top box 6010. The method may further include receiving imaging signals from the camera device through the set top box 6020 and sending the imaging signals to the mobile communication device 6030. It is understood that the processor of the PVR proxy server may be configured to perform one or all of the operations illustrated in FIG. 11.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A method comprising:
receiving, by a personal video recorder proxy server, a request for an interactive programming guide specific to a customer from a mobile communication device operating within a telecommunication environment;
sending, by the personal video recorder proxy server, a request for the customer specific interactive programming guide to at least one media content server separate from a set top box corresponding to an account of the customer, wherein the request for the customer specific interactive programming guide sent by the personal video recorder proxy server to the at least one media content server includes an identification of the set top box corresponding to the account of the customer;
receiving, by the personal video recorder proxy server in response to the request that includes the identification of the set top box corresponding to the account of the customer, the customer specific interactive programming guide from the at least one media content server, the customer specific interactive programming guide including channels that are available to the customer, the availability of the channels to the customer determined based on the identification of the set top box, a location of the set top box, and a subscription of the customer to a particular channel package;
sending, by the personal video recorder proxy server, the interactive programming guide received in response to the request that includes the identification of the set top box corresponding to the account of the customer to the mobile communication device through the telecommunication environment for display by the mobile communication device;
receiving, by the personal video recorder proxy server by way of the customer specific interactive programming guide while the mobile communication device is displaying the customer specific interactive programming guide, a request from the mobile communications device for a parental control selection to modify one or more parental controls associated with the set top box;
sending, by the personal video recorder proxy server, the request for the parental control selection to the set top box;
receiving, by the personal video recorder proxy server, a confirmation regarding the request for the parental control selection from the set top box;
sending, by the personal video recorder proxy server, a confirmation regarding the request for the parental control selection to the mobile communication device;
receiving, by the personal video recorder proxy server by way of the customer specific interactive programming guide while the mobile communication device is displaying the customer specific interactive programming guide, a request from the mobile communication device to overlay IP data associated with the parental control selection into media programming being displayed on a television connected to the set top box, wherein the IP data comprises at least one of a message and an image; and
sending, by the personal video recorder proxy server, the request to the at least one media content server.

2. The method of claim 1 further comprising:
receiving, by the personal video recorder proxy server, a request for recording a media program from the mobile communication device; and
sending, by the personal video recorder proxy server, the request for recording the media program to the set top box.

3. The method of claim 2 further comprising receiving, by the personal video recorder proxy server, a confirmation from the set top box regarding the request for recording the media program.

4. The method of claim 3 further comprising sending, from the personal video recorder proxy server to the mobile communication device, a confirmation regarding the request for recording the media program.

5. The method of claim 1 further comprising:
receiving, by the personal video recorder proxy server, a request for a media program from the mobile communication device through the telecommunication environment;
sending, by the personal video recorder proxy server, the request for the media program to the at least one media content server;
receiving, by the personal video recorder proxy server, the media program from the at least one media content server; and
sending, by the personal video recorder proxy server, the media program to the mobile communication device through the telecommunication environment.

6. The method of claim 2, further comprising receiving a recording request by the personal video recorder proxy server from the mobile communication device to edit a previously scheduled recording and sending, by the personal video recorder proxy server, the recording request to the set top box.

7. The method of claim 1, wherein the request to overlay IP data contains information specifying a particular timing of the overlaying of the IP data into the media programming being displayed on the television connected to the set top box.

8. The method of claim 1, wherein the request to overlay IP data further contains information specifying a particular timing of changing a blocked status of one or more channel selections.

9. The method of claim 1, wherein the IP data comprises real time flight information.

10. The method of claim 1, further comprising
receiving, by the personal video recorder proxy server, a request from the mobile communication device to replace media programming being displayed on a television connected to the set top box with additional IP data, wherein the additional IP data comprises at least one of a message and an image; and
sending, by the personal video recorder proxy server, the request to the at least one media content server.

11. A non-transitory computer-readable storage medium comprising a memory having executable computer-readable program code portions stored therein configured to direct a computer to:
receive a request for an interactive programming guide specific to a customer from a mobile communication device operating within a telecommunication environment;
send a request for the customer specific interactive programming guide to at least one media content server separate from a set top box corresponding to an account of the customer, wherein the request for the customer specific interactive programming guide includes an identification of the set top box corresponding to the account of the customer;
receive, in response to the request that includes the identification of the set top box corresponding to the account of the customer, the customer specific interactive programming guide from the at least one media content server, the customer specific interactive programming guide including channels that are available to the customer, the availability of the channels to the customer determined based on the identification of the set top box, a location of the set top box, and a subscription of the customer to a particular channel package;
send the interactive programming guide received in response to the request that includes the identification of the set top box corresponding to the account of the customer to the mobile communication device through the telecommunication environment for display by the mobile communication device;
receive, by way of the customer specific interactive programming guide while the mobile communication device is displaying the customer specific interactive programming guide, a request from the mobile communications device for a parental control selection to modify one or more parental controls associated with the set top box;
send the request for the parental control selection to the set top box;
receive a confirmation regarding the request for the parental control selection from the set top box;
send a confirmation regarding the request for the parental control selection to the mobile communication device;
receive, by way of the customer specific interactive programming guide while the mobile communication device is displaying the customer specific interactive programming guide, a request from the mobile communication device to overlay IP data associated with the parental control selection into media programming being displayed on a television connected to the set top box, wherein the IP data comprises at least one of a message and an image; and
send the request to the at least one media content server.

12. The non-transitory computer-readable storage medium of claim 11, wherein the computer-readable program code portions are further configured to direct the computer to:
receive a request for recording a media program from the mobile communication device; and
send the request for the recording of the media program to the set top box.

13. The non-transitory computer-readable storage medium of claim 12, wherein the computer-readable program code portions are further configured to direct the computer to receive a confirmation from the set top box regarding the request for the recording of the media program.

14. The non-transitory computer-readable storage medium of claim 13, wherein the computer-readable program code portions are further configured to direct the computer to send a confirmation regarding the request for the recording of the media program to the mobile communication device.

15. The non-transitory computer-readable storage medium of claim 11, wherein the computer-readable program code portions are further configured to direct the computer to:
receive a request for a media program from a mobile communication device through the telecommunication environment;
send the request for the media program to the at least one media content server;
receive the media program from the at least one media content server; and
send the media program to the mobile communication device through the telecommunication environment.

16. An apparatus comprising a processor that to:
receives a request for an interactive programming guide specific to a customer from a mobile communication device operating within a telecommunication environment;
sends a request for the customer specific interactive programming guide to at least one media content server separate from a set top box corresponding to an account of the customer, wherein the request for the customer specific interactive programming guide includes an identification of the set top box corresponding to the account of the customer;
receives, in response to the request that includes the identification of the set top box corresponding to the account of the customer, the customer specific interactive programming guide from the at least one media content server, the customer specific interactive programming guide including channels that are available to the customer, the availability of the channels to the customer determined based on the identification of the set top box, a location of the set top box, and a subscription of the customer to a particular channel package;
sends the interactive programming guide received in response to the request that includes the identification of the set top box corresponding to the account of the customer to the mobile communication device through the telecommunication environment;
receives, by way of the customer specific interactive programming guide while the mobile communication device is displaying the customer specific interactive programming guide, a request from the mobile communications device for a parental control selection to modify one or more parental controls associated with the set top box;

sends the request for the parental control selection to the set top box;
receives a confirmation regarding the request for the parental control selection from the set top box;
sends a confirmation regarding the request for the parental control selection to the mobile communication device;
receives, by way of the customer specific interactive programming guide while the mobile communication device is displaying the customer specific interactive programming guide, a request from the mobile communication device to overlay IP data associated with the parental control selection into media programming being displayed on a television connected to the set top box, wherein the IP data comprises at least one of a message and an image; and
sends the request to the at least one media content server.

17. The apparatus of claim 16, wherein the processor receives a request for recording a media program from the mobile communication device and to send the request for the recording of the media program to the set top box.

18. The apparatus of claim 17, wherein the processor receives a confirmation regarding the request for the recording of the media program from the set top box and to send a confirmation regarding the request for the recording of the media program to the mobile communication device.

19. The apparatus of claim 17, wherein the processor receives a request for a media program from the mobile communication device through the telecommunication environment; to send the request for the media program to the at least one media content server; to receive the media program from the at least one media content server; and to send the media program to the mobile communication device through the telecommunication environment.

* * * * *